July 11, 1939.  E. SCHAEREN  2,165,658
ANGULARLY ADJUSTABLE SHAFT COUPLING DEVICE
Filed May 10, 1937
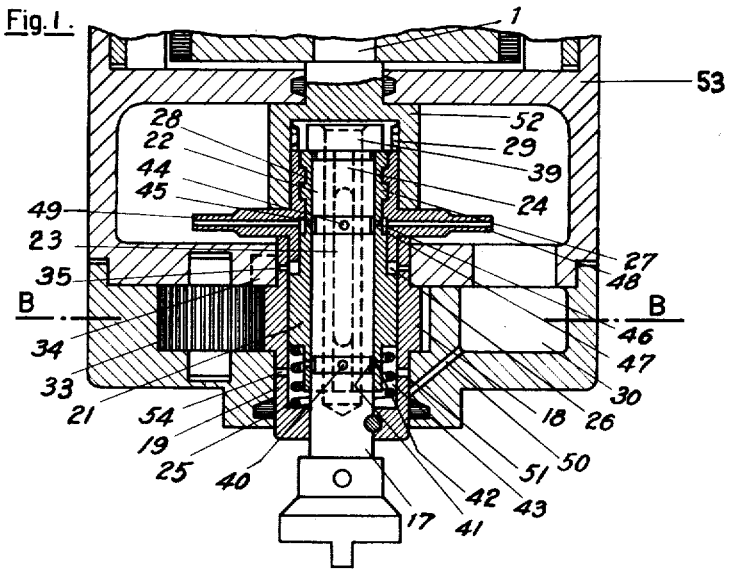
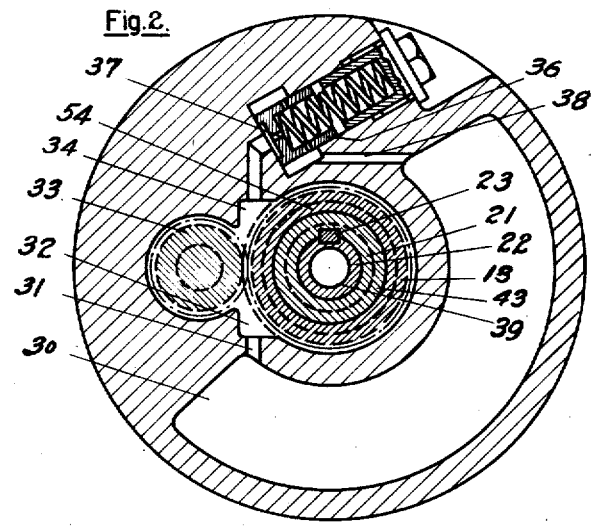
Inventor:
Ernst Schaeren Patented July 11, 1939

2,165,658

UNITED STATES PATENT OFFICE 2,165,658

ANGULARLY ADJUSTABLE SHAFT COUPLING DEVICE

Ernst Schaeren, Soleure, Switzerland, assignor to Scintilla, Ltd., Soleure, Switzerland, a corporation of Switzerland Application May 10, 1937, Serial No. 141,876
In Switzerland May 13, 1936

9 Claims. (Cl. 64—25)

This invention relates to angularly adjustable shaft coupling devices and more particularly to such angularly adjustable shaft coupling devices by which the relative angular adjustment of two coaxial shafts is controlled by means of fluid pressure.

One object of the invention is to provide such a device of compact construction, without any linkage or piping outside the casing of the coupling.

Another object of the invention is to provide a device of this kind in which the relative angular adjustment of the shafts is effected automatically according to the speed of rotation of the said shafts.

With this general statement of the objects and purposes of my invention, I will now proceed to describe the embodiment thereof and the manner in which my invention may be carried out, and it will be understood that while I have described what may be considered as a preferable embodiment of my invention, I do not limit myself to the precise features, herein set forth, as they may be varied by those skilled in the art in accordance with the particular purposes for which they are intended and the conditions under which they are to be utilised.

Though an embodiment of the invention is shown and described in conjunction with a magneto-electric ignition apparatus for internal combustion engines, it will be understood that the invention relates to couplings of the kind set forth as used in conjunction with any apparatus or machinery, where its use may be found suitable, for instance with fuel injection pumps for internal combustion engines.

In the drawing:

Fig. 1 is an axial (vertical) section of the angularly adjustable drive mechanism as used to drive an ignition device which may include a primary current breaker and high tension distributor.

Fig. 2 is a section on the line BB of Fig. 1.

The shaft 1 is the shaft of the ignition device or other mechanism to be driven. The function of the drive herein described and claimed is to change the angular relation of shaft 1 to the engine shaft which drives it and thus change the timing of ignition or other event in the engine cycle effected by shaft 1. The description will now proceed on the assumption that an ignition device is driven.

By means of the device for the automatic timing of the ignition, the shaft 1 of the ignition apparatus is coupled to the driving shaft 17. The latter is coupled in such a way to the shaft of the internal combustion engine that one revolution of the shaft 17 and one ignition at each spark plug corresponds to each working cycle of the internal combustion engine.

The shaft 17 carries one gearwheel 18 of a gearwheel pump. The hub 19 of the gearwheel 18 contains a cylindric recess 20 into which the adjusting piston 21 is tightly fitted. Besides being guided in the gearwheel hub, the adjusting piston 21 also follows an axial guide stem 22 formed by the end of the shaft 17. This stem is provided with a longitudinal key 23 which engages a keyway 24 in the bore of the adjusting piston 21 so that the latter is displaceable only in the direction of its axis and that it revolves with the shaft 17 and the gearwheel 18. On one face, the piston 21 is loaded by the helical spring 25 which is located in the annular chamber 43, whilst the opposite face of the piston is acted upon by the liquid pressure in the annular chamber 26. The adjusting piston 21 is provided with a high pitch screw thread 27 engaging a screw nut member 28 which transmits its rotation to the shaft 1 of the ignition apparatus by means of dogs 29.

Through a bore 31 the supply chamber 30 filled with lubricating oil communicates with the suction chamber 32 of the gearwheel pump formed by the gearwheel 18 and the pinion 33 in mesh therewith. The delivery chamber 34 of this pump communicates with the annular chamber 26 through bores 35 and with the reserve chamber 30 through a throttling passage 37 provided in the spring-loaded safety valve 36 and through a port 38.

The shaft end 22 contains a longitudinal bore 39 and a transverse bore 40 issuing therein and communicating with the annular chamber 43 by means of an annular groove 41 and bores 42 in the hub of the piston 21. A further transversal bore 44 leads from the longitudinal bore 39 into the annular groove 45, which itself communicates with the chamber 47 by bores 46 in the piston 21. The screw nut member 28 is fitted with a thrower disc 48 having bores 49 which lead from the annular space 47 to the supply chamber 30. From the latter, a lubricating passage 50 joins the bearing surface 51 of the gearwheel hub 19.

The shaft 1 and the screw nut member cannot be displaced in the direction of their axis, as the end collar 52 of the shaft and the thrower disc 48 are retained between the bottom 53 of the casing and the gearwheel 18.

The described adjusting device for the ignition timing operates as follows:

In the delivery chamber 34 the pump formed by the gearwheels 18 and 33 raises a pressure which increases with the rotation speed of the shaft 17, on account of the throttling effect of the passage 37. The piston 21, which is acted upon on one side by this pressure prevailing also in the annular chamber 26 and on the other side by the force of the spring 25, therefore changes its position according to the engine speed. As it is displaceable in relation to the shaft 17 only in the direction of its axis whilst the shaft 1 can only move angularly, the latter is displaced relatively to the driving shaft 17 when the piston 21 moves, the shaft 1 advancing when the speed of rotation increases. Thus both the time of the change of the flux direction in the magnetic circuit and the time of the breaking of the primary current are automatically advanced in relation to the position of the piston in the working cylinder when the engine speed increases, as is necessary for obtaining quiet running and the best performance.

By centrifugal action of the thrower disc 48 a slight depression results in the chamber 47 and consequently in the longitudinal bore 39 and in the annular chamber 43, so that a little oil is continually aspirated through the lubricating passage 50, the bearing surface 51 and the holes 54 while the engine is running. The oil leaking from the annular chamber 26 into the chamber 47 is also thrown off into the supply chamber 30. The important bearing surfaces of the adjusting device are thus continually lubricated with fresh oil. The safety valve 36 serves to prevent an unadmissible rise of pressure in the chambers 34, 35 and 26 in case the throttling passage should become obstructed. When a definite maximum pressure is exceeded the valve 36 is lifted from its seating and allows the oil to pass from the delivery chamber 34 to the port 38.

While the form of embodiment of the present invention as herein disclosed, constitutes a preferred form, it is to be understood that other forms might be adopted, all coming within the scope of the claims which follow.

What I claim is:

1. An angularly adjustable shaft coupling device comprising in combination a driving shaft, a driven shaft substantially coaxial with said driving shaft, an axially displaceable piston member angularly coupled to one of said shafts and having a portion provided with a high pitch screw thread substantially coaxial to said shafts, an axially undisplaceable member angularly coupled to the other of said shafts and provided with a screw thread engaging said screw thread of said piston member, a gear pump body, a first gearwheel rotatably mounted in said gear pump body and coupled to one of said shafts, said first gearwheel having a cylindric recess into which said piston member fits so as to bound a pressure chamber therein and ports communicating with said pressure chamber, a spring interposed between said piston member and an abutment formed in said gearwheel and adapted to press said piston member into said pressure chamber, a second gearwheel rotatably mounted in said gear pump body and meshing said first gearwheel, said gear pump body tightly enclosing both said gearwheels and having recesses forming a suction chamber and a delivery chamber separated from each other by the meshing portions of said gearwheels, said gear pump body also having a recess adjoining said first gearwheel and communicating with said ports therein and with said delivery chamber, said gear pump body further containing a liquid supply chamber in communication with said suction chamber and with said delivery chamber, a throttling member provided with a restricted passage in said communication between said supply chamber and said delivery chamber.

2. An angularly adjustable shaft coupling device comprising in combination a driving shaft, a driven shaft substantially coaxial with said driving shaft, one of said shafts having a longitudinal bore and circumferential grooves communicating with said longitudinal bore, a piston member axially slidable on a portion of said one shaft and having bearing surfaces therewith and passages adjoining said annular grooves, said piston member being angularly coupled to any one of said shafts and having a portion provided with a high pitch screw thread substantially coaxial to said shafts, an axially undisplaceable member angularly coupled to the other of said shafts and provided with a screw thread engaging said screw thread of said piston member, said axially undisplaceable member having a thrower disc formed thereon and substantially radial passages provided in said thrower disc and communicating one of said circumferential grooves of said longitudinally bored shaft.

3. The combination of a housing enclosing a chamber for the rotor of a rotary displacement pump, a chamber containing hydraulic liquid and passages for connecting said chamber with the discharge and intake of said pump; two axially aligned shafts whose proximate ends are mounted in said housing; a pump rotor arranged to be driven by one of said shafts; a piston axially shiftable within said rotor; spline connections between said piston and each of said shafts, at least one of said spline connections being spiral and the spline connections so arranged that axial displacement of the piston entails relative angular displacement of said shafts; means for subjecting said piston in one direction to the discharge pressure developed by said pump; and yielding means opposing motion of said piston under said pressure.

4. The combination of a housing enclosing a chamber for the rotor of a rotary displacement pump, a chamber containing hydraulic liquid and passages for connecting said chamber with the discharge and intake of said pump; two axially aligned shafts whose proximate ends are mounted in said housing; a pump rotor arranged to be driven by one of said shafts; a piston axially shiftable within said rotor; spline connections between said pistons and each of said shafts, at least one of said spline connections being spiral and the spline connections so arranged that axial displacement of the piston entails relative angular displacement of said shafts; means for subjecting said piston in one direction to the discharge pressure developed by said pump; yielding means opposing motion of said piston under said pressure; means for throttling the discharge of said pump to develop a back pressure upon said piston; and a loaded relief valve controlling a by-pass around said throttling means for relieving excess pressure.

5. An angularly adjustable shaft connection comprising in combination with two axially aligned shafts, a pump rotor driven by one of said shafts; a pressure motor of the cylinder and piston type mounted co-axially with said shafts and including a movable element actuated by the motor and splined to both shafts in such a way that axial displacement of such element entails angular displacement of the shafts relatively to one another; a housing enclosing the ends of said shafts, said pump rotor and said motor, said housing serving also as a reservoir for hydraulic liquid and affording supply and restricted discharge passages from said reservoir to said pump and back to said reservoir, and a passage for subjecting said motor to the discharge pressure of said pump; and yielding mean opposing motion of said motor under the urge of said discharge pressure.

6. The combination defined in claim 3 in which the hydraulic liquid is a lubricant and in which centrifugal impeller means are arranged to be driven by one of the shafts and serve to induce a secondary circulation of hydraulic liquid in contact with portions of said piston and the related splines to insure lubrication thereof.

7. The combination defined in claim 5 in which the hydraulic liquid is a lubricant and in which centrifugal impeller means are arranged to be driven by one of the shafts and serve to induce a secondary circulation of hydraulic liquid in contact with portions of said motor and the related splines to insure lubrication thereof.

8. A shaft coupling device for liquid pressure controlled angular adjustment of a driving shaft and a driven shaft comprising the combination with said driving and driven shafts of a cylinder carried by one of said shafts and co-axial with both shafts; a piston member fitting in said cylinder and defining therewith a pressure chamber wherein said controlling liquid pressure acts, said piston member being splined to one of said shafts and having a portion provided with a quick pitch thread; a member coupled to the other of said shafts and confined against axial shifting motion, said member being provided with quick pitch thread co-acting with the thread on said piston member; and a spring reacting against said piston.

9. The combination defined in claim 8 in which the piston encircles the portion of one of said shafts and is splined thereto.

ERNST SCHAEREN.

---

CERTIFICATE OF CORRECTION.

Patent No. 2,165,658.            July 11, 1939.

ERNST SCHAEREN.

It is hereby certified that error appears in the printed specification of the above numbered patent requiring correction as follows: Page 2, second column, line 24, claim 2, after the word "communicating" insert with; page 3, first column, line 8, claim 5, for "mean" read means; and that the said Letters Patent should be read with this correction therein that the same may conform to the record of the case in the Patent Office.

Signed and sealed this 15th day of August, A. D. 1939.

Leslie Frazer (Seal)            Acting Commissioner of Patents.

one another; a housing enclosing the ends of said shafts, said pump rotor and said motor, said housing serving also as a reservoir for hydraulic liquid and affording supply and restricted discharge passages from said reservoir to said pump and back to said reservoir, and a passage for subjecting said motor to the discharge pressure of said pump; and yielding mean opposing motion of said motor under the urge of said discharge pressure.

6. The combination defined in claim 3 in which the hydraulic liquid is a lubricant and in which centrifugal impeller means are arranged to be driven by one of the shafts and serve to induce a secondary circulation of hydraulic liquid in contact with portions of said piston and the related splines to insure lubrication thereof.

7. The combination defined in claim 5 in which the hydraulic liquid is a lubricant and in which centrifugal impeller means are arranged to be driven by one of the shafts and serve to induce a secondary circulation of hydraulic liquid in contact with portions of said motor and the related splines to insure lubrication thereof.

8. A shaft coupling device for liquid pressure controlled angular adjustment of a driving shaft and a driven shaft comprising the combination with said driving and driven shafts of a cylinder carried by one of said shafts and co-axial with both shafts; a piston member fitting in said cylinder and defining therewith a pressure chamber wherein said controlling liquid pressure acts, said piston member being splined to one of said shafts and having a portion provided with a quick pitch thread; a member coupled to the other of said shafts and confined against axial shifting motion, said member being provided with quick pitch thread co-acting with the thread on said piston member; and a spring reacting against said piston.

9. The combination defined in claim 8 in which the piston encircles the portion of one of said shafts and is splined thereto.

ERNST SCHAEREN.

---

CERTIFICATE OF CORRECTION.

Patent No. 2,165,658. July 11, 1939.

ERNST SCHAEREN.

It is hereby certified that error appears in the printed specification of the above numbered patent requiring correction as follows: Page 2, second column, line 24, claim 2, after the word "communicating" insert with; page 3, first column, line 8, claim 5, for "mean" read means; and that the said Letters Patent should be read with this correction therein that the same may conform to the record of the case in the Patent Office.

Signed and sealed this 15th day of August, A. D. 1939.

Leslie Frazer

Acting Commissioner of Patents.

(Seal)